(12) United States Patent
Riggs et al.

(10) Patent No.: US 8,676,268 B2
(45) Date of Patent: Mar. 18, 2014

(54) SYSTEM AND METHOD FOR MONITORING AND RESTRICTING THE USAGE OF A MOBILE COMMUNICATION DEVICE

(75) Inventors: Steven J. Riggs, West Lafayette, IN (US); Richard J. Skertic, Carmel, IN (US)

(73) Assignee: Steven J. Riggs, Carmel, IN (US)

( * ) Notice: Subject to any disclaimer, the term of this patent is extended or adjusted under 35 U.S.C. 154(b) by 214 days.

(21) Appl. No.: 12/868,213

(22) Filed: Aug. 25, 2010

(65) Prior Publication Data

US 2012/0052834 A1 Mar. 1, 2012

(51) Int. Cl.
*H04M 11/04* (2006.01)

(52) U.S. Cl.
USPC ............... 455/565; 455/404.2; 455/456.1

(58) Field of Classification Search
None
See application file for complete search history.

(56) References Cited

U.S. PATENT DOCUMENTS

| | | | |
|---|---|---|---|
| 6,353,778 B1 | 3/2002 | Brown | |
| 6,690,940 B1 | 2/2004 | Brown et al. | |
| 7,590,405 B2 | 9/2009 | Ewell, Jr. | |
| 8,380,161 B2 | 2/2013 | Ewell, Jr. | |
| 8,385,880 B2 | 2/2013 | Ewell, Jr. et al. | |
| 2007/0049289 A1* | 3/2007 | Woo ........................ | 455/456.1 |
| 2008/0299954 A1 | 12/2008 | Wright | |
| 2008/0318562 A1 | 12/2008 | Featherstone et al. | |
| 2009/0002147 A1* | 1/2009 | Bloebaum et al. ............ | 340/466 |
| 2011/0021234 A1 | 1/2011 | Tibbitts et al. | |
| 2011/0093161 A1 | 4/2011 | Zhou | |

OTHER PUBLICATIONS

"Manage Mobility, LLC Partners with WebSafety, Inc. to Utilize Its "CellSafety" Product Which Prevents Texting and Emailing While Driving", Enhanced Online News, Jul. 21, 2010.
"Nationwide Insurance and Aegis Mobility Unveil New Technology T oAddress the Problem of Driving While Distracted", Oct. 13, 2008.
"Tech Takes Texting Off the Road", USA Today, Jul. 21, 2010.
"Texting Terror", Glo, Aug. 2010, p. 15.
Cheng, Roger "Car Phones Getting Smarter", The Wall Street Journal, Apr. 28, 2010.
htt;://zoomsafer.com//, "Zoomsafer Prevents Distracted Driving", article accessed online on Nov. 22, 2010.
http://en.wikipedia.org/wiki/SMS, Accessed online on Feb. 4, 2010.
http://txtblocker.com/ "Welcome to tXtBlocker" Accessed online on Nov. 22, 2010.
http://www.aegismobility.com/home/solutions/driveassist-overview "DriveAssist Overview Manage Moble Phone Use While Driving" Accessed online on Nov. 22, 2010.
http://www.getizup.com/ "Drive Undistracted", Accessed online on Nov. 22, 2010.
http://www.nationwidesmartride.com "Helping Teens Drive Smarter", Accessed online on Nov. 22, 2010.
http://www.nsc.org//safety road/distracted driving, "What's New in Distracted Driving", Accessed online on Nov. 22, 2010.
http://www.websafety.com/cell-safety/, "CellSafety Product Overview", Accessed online on Nov. 22, 2010.
Molina, Alejandra"Texting While Driving Is on Rise", The Orange County Register, May 3, 2010.
Reading GPS.
Slyder, Curt, "Texting While Driving Ban a Possibility", JCOnline.com, Accessed online on Nov. 22, 2010.
Vehicle Derived Communications.
www.onstar.com/web/portal/useonstar, Accessed online on Nov. 22, 2010.

* cited by examiner

*Primary Examiner* — Kashif Siddiqui
(74) *Attorney, Agent, or Firm* — Ice Miller LLP

(57) ABSTRACT

A system and methodology for monitoring and restricting the use of a mobile communication device while operating a moving vehicle is disclosed. The mobile communications device environmental/geometrical context and the vehicle environmental/geometrical context are self determined, shared and stored locally. This information context is used to restrict a mobile communication device communication channel when motion conditions have been met. Further methods are disclosed to allow the mobile communication device to function normally when local vehicle location and synchronization have been established or an emergency communication channel initiated.

20 Claims, 4 Drawing Sheets

Mobile Communication Device

Mobile Communication Device

Vehicle Communication Device

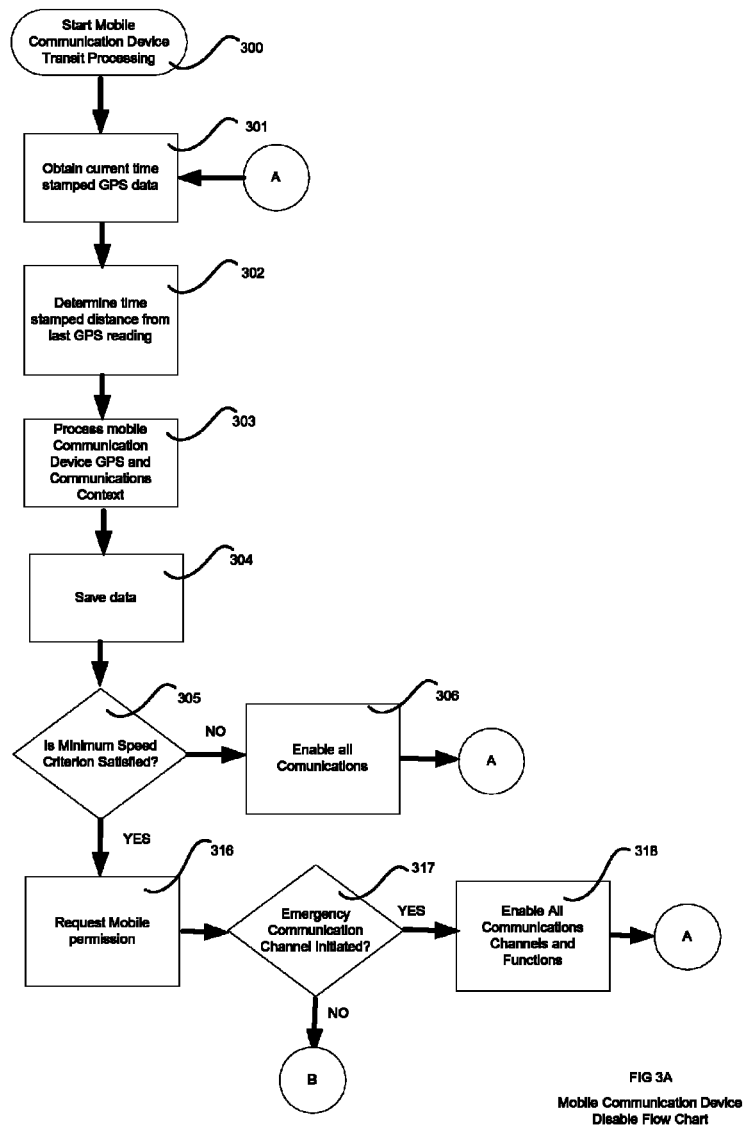

Mobile Communication Device
Disable Flow Chart (continued)

Vehicle Communication Device Decision Flow Chart

SYSTEM AND METHOD FOR MONITORING AND RESTRICTING THE USAGE OF A MOBILE COMMUNICATION DEVICE

BACKGROUND OF THE INVENTION

The premise of the idea is to inhibit mobile communications from executing while driving only, and not block the use of the mobile communication device being used by others within the vehicle or when not moving or not in the vehicle. There are two context levels to this product. The first level is to disable the mobile communications device while the vehicle is moving. The second level is to determine if the mobile communications device is in the vicinity of the driver and if so, keep that mobile communications device disabled and reestablish communications for all other mobile communications devices unless they too are in the vicinity of the driver. The mobile communications device should function as normal when it is not moving or is not in a vehicle.

BRIEF SUMMARY OF THE INVENTION

This invention relates to a methodology, algorithms and monitoring controls for the use of a mobile communications device within a vehicle to prevent the driver from becoming distracted while driving (DWD) but allow the usage of the mobile communications device when not driving (a passenger) or when not in a moving vehicle or during an emergency. A DWD driver has become a serious problem in today's society. "Driver inattention is a factor in more than 1 million crashes in North America annually, resulting in serious injuries, deaths and an economic impact reaching nearly $40 billion per year"; as reported by the AAA Foundation for Traffic Safety.

There are a few methods in the prior art that address this concern but go to great lengths in defining an approach that redefines the current mobile network to accommodate their methodology. There seems to still be a need for a simpler less intrusive method or approach.

The current methodology presented here will offer significant advantages over prior devices and methods by providing, according to one embodiment of the invention, a method of determining the real time location of the mobile communication device within a moving vehicle to limit driver distraction. The invention does not determine the level of risk associated with having the functions available. This is assumed to be factual that DWD drivers are at high risk. The determination of the mobile communication device' location is achieved through another embodiment of the invention that gathers the mobile communication device environmental/geometrical context information as well as vehicle environmental/geometrical context information to be evaluated by assessment algorithms to determine if the mobile communication device should have full access to all of its functions. Passengers can call, text and run application functions but when the phone is moved into the vicinity of the driver the call, text messaging and application functions are disabled.

The mobile communication device will assess its own context information, according to one embodiment of the invention, to determine how to manage its own functions. According to a further embodiment of the invention, it is only through the initiation of a synchronization methodology between the mobile communication device and the vehicle that will determine if the mobile communication device will continue functioning in the mobile communication devices previous, on going or determined communications state.

The real time location of the mobile communication device within a moving vehicle is further enhanced, according to one embodiment of the invention, through a periodic synchronization signal algorithm methodology allowing the vehicle to determine where the mobile communication device is located at any one time and allowing the mobile communication device to continue functioning in its current state. If the vehicle does not have a GPS then all phones in the vehicle will be disabled because they will be moving.

Neither the foregoing summary nor the following description purports to define the invention. The invention is defined by the claims.

BRIEF DESCRIPTION OF THE DRAWINGS

FIG. 3A-3B illustrates the computational flow diagram algorithm of the mobile communication device utilizing the mobile communication device environmental/geometrical context to inhibit all communications.

DETAILED DESCRIPTION OF THE PREFERRED EMBODIMENTS/INVENTION

Figure 1:
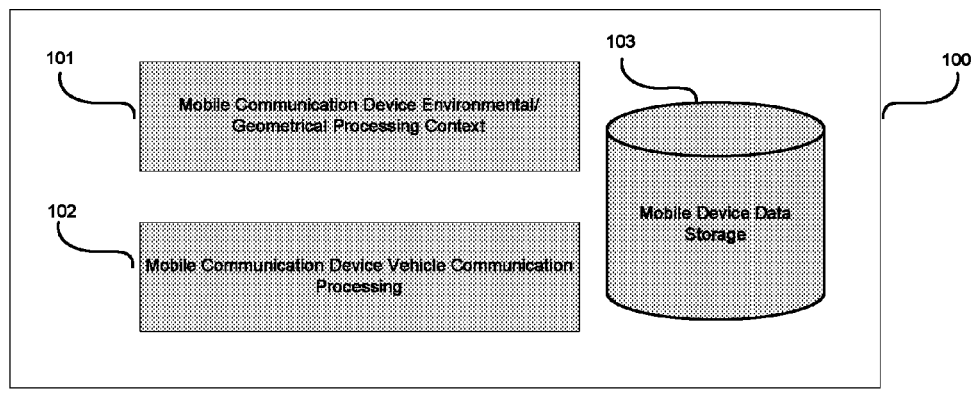
FIG. 1 illustrates aspects of the mobile communication device in an embodiment of mobile communication device environment.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

A preferred embodiment of the present invention provides for the monitoring and restricting the use of a mobile communication device given the determination of the current mobile communication device environment/geometrical context and a level of risk associated with the use of the mobile communication device within that geometrical context definition.

The system and method generally comprised of the mobile communication device (100), its sensors and the vehicle computational device (200) with its sensors which can be a separate component in the vehicle or a vehicle controller. The mobile communication device of FIG. 1 can include components to facilitate one or more functions required by this invention but does not define the total functional capability of the mobile communications device (100) and is used here for illustrative purposes only. The mobile communication device (100) includes algorithms to process the mobile communication device environmental/geometrical context (101), a mobile communication device vehicle communication processing (102) and a mobile communication device data storage (103).

The mobile communication device (100) includes the environmental/geometrical context processing algorithm (101) to determine the mobile communication device information context. This mobile communication device context information is used to determine the mobile communication device mobility and if such velocity which is defined with a directional vector, has reached a minimum value. This context information and the decision shall be exercised before, during or after any communication channel had been established and at a periodic interval. Once the criterion has been met, the communication channel is inhibited from being utilized. This inhibit state will continue until the mobile communication device context information does not satisfy the decision criterion or an emergency communication channel has been initiated.

The mobile communication device (100) can further include a mobile communication device data storage (103) for recording the past mobile communication device context information as well as the current context information and the various context/decision algorithms or processes used by the mobile communications device to assess in determining if the minimum velocity has been achieved. It further stores that decision point value as well as the algorithms to inhibit the communication channel and all application functions.

The mobile communication device (100) further includes the mobile communication device vehicle communication synchronization algorithms and processing (102). This process shall be initiated by the user if desired so that the vehicle communication device can determine the risk level involved for using the mobile communication device. This vehicle communication channel must synchronize in order for the mobile communication device to transmit its information context to the vehicle for processing. The vehicle processing algorithms shall be defined in greater detail below.

Figure 2:
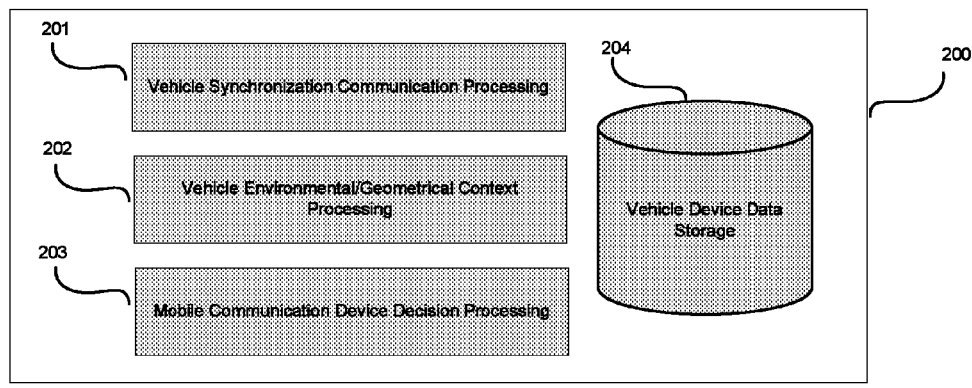
FIG. 2 illustrates aspects of the vehicle communication device in an embodiment of vehicle computational context environment

The vehicle communication device of FIG. 2 can include components to facilitate one or more functions required by this invention but does not define the total functional capability of the vehicle communications device (200) and is used here for illustrative purposes only. The vehicle communication device (200) includes algorithms to process the vehicle communication device environmental/geometrical context (202), a vehicle communication device processing (201), mobile communication device decision algorithm processing (203) and a vehicle device data storage (204).

The vehicle communication device (200) includes the environmental/geometrical context processing algorithm (202) to determine the vehicle device information context. This vehicle device context information is used to determine the geometrical context of the mobile communication device and if the context is determined not to be within a defined area within the vehicle by executing the Mobile communication device decision algorithm processing (203), an unrestrained command is sent to the mobile communication device across the synchronized communication channel (201) to allow normal mobile communication device functionality. This geometrical context information and the determination of whether the mobile communication device is within the defined area shall be exercised before, during or after any communication channel had been established and at a periodic interval.

The vehicle communication device (200) can further include a vehicle device data storage (204) for recording the past vehicle device context information as well as the current context information and the various context/decision algorithms or processes used by the vehicle communication device (200) to assess if the mobile communication device enters or is in a define area of the vehicle. It further stores the area definition as well as the algorithms to sustain the synchronization communication channel and if the mobile communication device is to be inhibited or not.

Figure 3B:
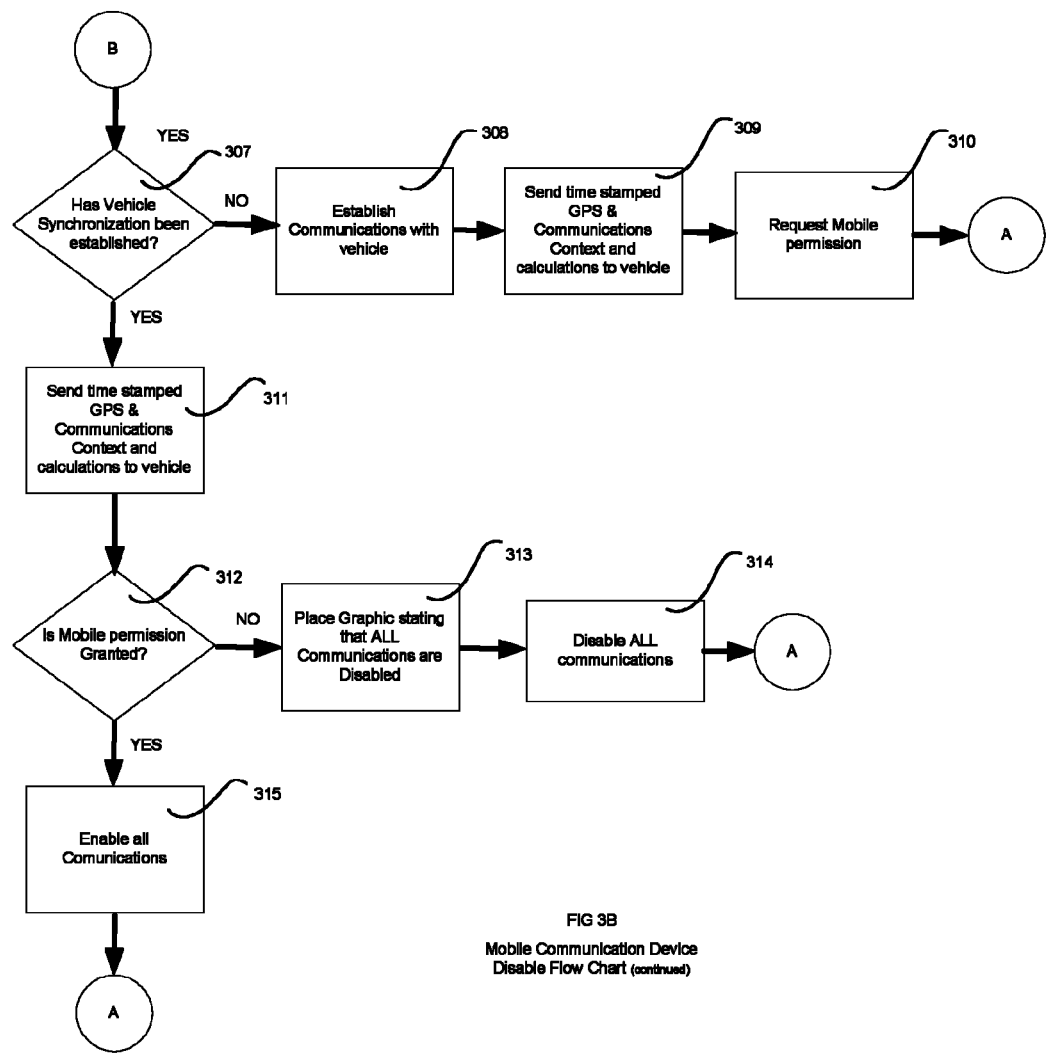

The context algorithms use by the mobile communication device algorithms processing (101) is illustrative in a process flow diagrams in FIG. 3A-3B. As stated above, the mobile communication device processing routine (300) acquires environmental/geometrical context information (301) from the mobile communication device' (100) integrated sensors to determine the velocity of the device. For example, the algorithm can be used to analysis time stamped Global Positioning System or GPS context data in conjunction with the mobile storage device context data (103) to calculate appropriate context data (303) to determine distance and movement. The resulting context data is stored (304). This context data is further analyzed (305) to determine if a minimum velocity criteria has been achieved. If the criteria has not been achieved than the mobile communication device (100) remains in the normal functioning state (306). If the criteria is achieved, than all mobile communication channels and functions (316) are disabled.

The process also includes processing for establishing a user initiated vehicle synchronization command (307). If the command is issued than the mobile communication device (100) tries to establish a communication channel with the vehicle (308). Once established, the context that is in the mobile communication storage and currently calculated data is communicated to the vehicle either through a synchronized wired or wireless channel (309). Along with the context information, a request is sent from the mobile communication device (100) to the vehicle for normal communications (310). With the synchronization established and the mobile environmental/geometrical context (311) sent along with the request for mobile communication permission (310) pending, if granted than all communication channels and functions are enabled (315). If the request is denied (312) than a graphic is displayed (313) on the mobile communication device (100) and all communication channels and functions remain disabled (314). The process repeats periodically and is only returned to normal operation when the movement criteria is not achieved or an emergency channel (317) has been initiated. If an emergency channel is established all functions and communications channels are restored (318) until the channel is disconnected and the mobile communication device (100) will revert back to the previous state with the process repeating.

Figure 4:
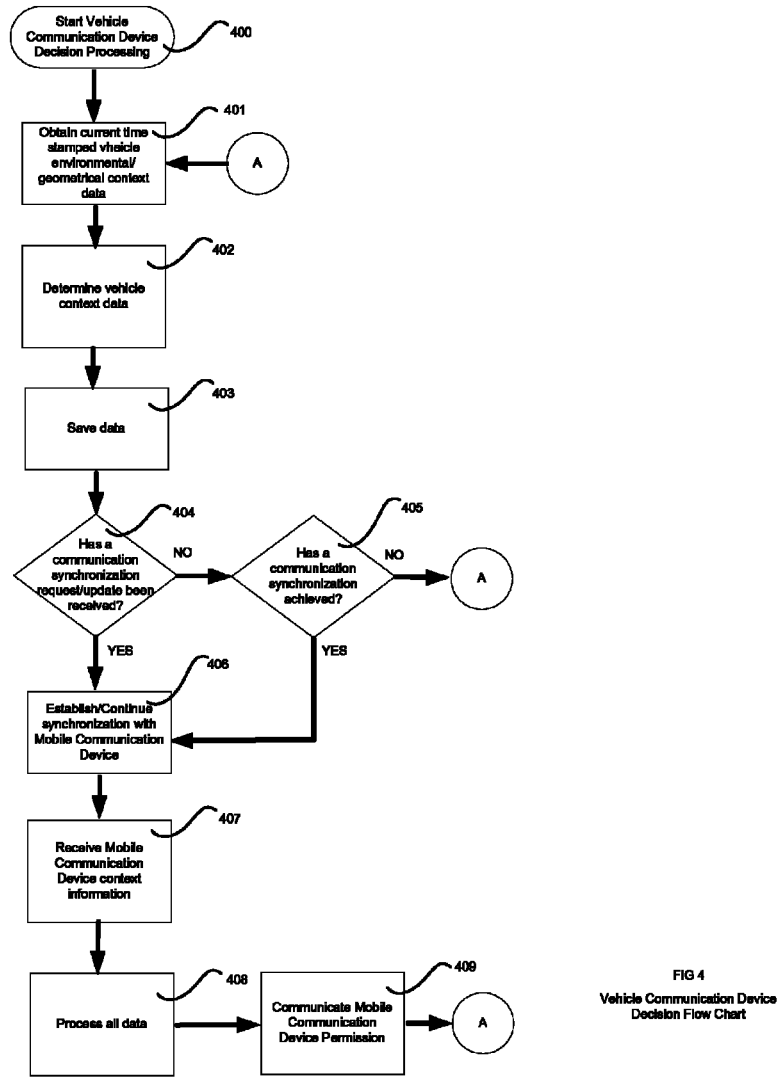
FIG. 4 illustrates the computational flow diagram algorithm for the vehicle utilizing the mobile communication device environmental/geometrical context along with the vehicle context to decide if the mobile communication device should be allowed to function normally once synchronized with the vehicle.

The context algorithms use by the vehicle communication device algorithm processing (202) is illustrative in a process flow diagrams in FIG. 4. As stated above, the vehicle communication device processing routine (400) acquires environmental/geometrical context information (401) from the vehicle communication device' (200) integrated sensors. With the collection of context data, determination of the vehicle context (i.e. velocity and location) is calculated (402) and the data stored (403) for future algorithm processing. This process repeats periodically and no other action is taken unless a synchronization request (404) is received from the mobile communication device (100). If no request is received and no synchronization achieved (405) the process is repeated. Upon a synchronization request from the mobile communication device (100) or if an update is needed the device will establish/continue to keep the channel open (406) to receive mobile communication device context data (407). With both the vehicle and mobile context data known, algorithms are processed (408) to determine a permission state for that mobile communication device (100). The resulting permission state will be transmitted back (409) to the mobile communication device (100) to allow full functionality or if the decision criteria to allow full functionality is not achieved then no permission signal is sent and the mobile communication device (100) remains in its inhibited state. Once the decision is transmitted the process is repeated in a periodic manner.

What is claimed is:

1. A method of inhibiting the use of a mobile communication device while in motion comprising the acts of:
    (a) The mobile communication device:
        (i) repeatedly obtaining time stamped mobile device GPS data of its location, storing the current environmental/geometrical context in computer memory; and,
        (ii) said mobile communication device self-determining its movement from said mobile device GPS data given its environmental/geometrical context, and
        (iii) initially inhibiting at least one transmitting, receiving and on-going communication channel of the mobile communications device in response to said act of self-determining the mobile communications device's velocity reaching a minimum velocity value; and
    (b) having a communications synchronization between: (i) said mobile communications device; and (ii) a separate vehicle communication device which has a GPS sensor to obtain vehicle GPS data of its location;
    (c) wherein, when said mobile communication device both:
        (i) has said communication synchronization between it and said vehicle communication device to compare the mobile device GPS data of the mobile communication device to the vehicle GPS data of the vehicle communication device; and,
        (ii) is outside a vicinity in the vehicle corresponding to the driver location based on the comparison of the mobile device GPS data of the mobile communication device and the vehicle GPS data of the vehicle communication device, then said vehicle communication device signals said mobile communication device and suspends said inhibiting of said at least one communication channel of the mobile communications device.

2. The method of claim 1, wherein the method performed establishes a synchronization communication channel with said vehicle communication device and transmits the mobile communication device environmental/geometrical context to said vehicle communication device.

3. The method of claim 1, wherein the vehicle communication device determines its location and movement context, storing the environmental/geometrical context of the vehicle communication device along with the other environmental/geometrical context of the synchronized mobile communication device, and determining the mobile communication device level of risk for the user and transmit that level to the synchronized mobile communication device.

4. The method of claim 1, and further comprising the acts of receiving an indication of the level of risk in order to grant the moving synchronized mobile communication device full access to all communications channels and functions or to keep all communication channels and functions inhibited.

5. The method of claim 3, wherein, the environmental/geometrical context of a synchronized mobile communication device is further enhanced through a signal strength algorithm to determine the geometrical context of the synchronized mobile communication device.

6. The method of claim 1, wherein the inhibiting of all communication channels and functions are suspended by the establishment of an emergency communication channel.

7. The method of claim 1, wherein a minimum speed requirement must be achieved by the mobile communications device before all communication channels and functions are inhibited.

8. The method of claim 1, wherein a graphic or tone indication of the mobile communication device that all communication channels and functions are inhibited.

9. The method of claim 1, wherein at least one application program or function having a primary function that is non-communication is inhibited in response to said act of self-determining the mobile communications devices velocity reaching said minimum velocity value.

10. The method of claim 1, wherein said vehicle communication device:
    (i) repeatedly obtains time stamped vehicle GPS data of its location, and stores that location data in computer memory; and,
    (ii) said vehicle communication device self-determines its location and movement from said vehicle GPS data.

11. The method of claim 10, wherein the mobile communication device transmits its environmental/geometrical context to said vehicle communication device.

12. The method of claim 11, wherein said vehicle communication device uses said vehicle GPS data in determining the geometrical context of the mobile communication device as to whether the mobile communication device is within a defined area of the vehicle.

13. A mobile communication device for inhibiting its use while in motion comprising:
    (a) A mobile communication device adapted for:
        (i) repeatedly obtaining time stamped mobile device GPS data of its location, and storing the current environmental/geometrical context in computer memory; and,
        (ii) said mobile communication device self-determining its movement from said mobile device GPS data given its environmental/geometrical context, and
        (iii) initially inhibiting at least one transmitting, receiving and on-going communication channel of the mobile communications device in response to said act of self-determining the mobile communications device's velocity reaching a minimum velocity value; and
    (b) wherein said mobile communications device is adapted for communications synchronization between: (i) said mobile communications device; and, (ii) a separate vehicle communication device which has a GPS sensor to obtain vehicle GPS data of its location;
    (c) wherein said mobile communications device is adapted for use when said mobile communication device both:
        (i) has said communication synchronization between it and said vehicle communication device to compare the mobile device GPS data of the mobile communication device to the vehicle GPS data of the vehicle communication device; and,
        (ii) is outside a vicinity in the vehicle corresponding to the driver location based on the comparison of the mobile device GPS data of the mobile communication device and the vehicle GPS data of the vehicle communication device, then said vehicle communication device signals said mobile communication device and suspends said inhibiting of said at least one communication channel of the mobile communications device.

14. The device of claim 13, wherein at least one application program or function having a primary function that is non-communication is inhibited in response to said self-determining the mobile communications device's velocity reaching said minimum velocity value.

15. The device of claim 14, wherein the inhibiting of all communication channels and functions are suspended by the establishment of an emergency communication channel.

16. The device of claim 15, wherein a minimum speed requirement must be achieved by the mobile communications device before all communication channels and functions are inhibited.

17. The method of claim 1, wherein the GPS sensor of the vehicle communication device repeatedly obtains time stamped vehicle GPS data of its location and stores the current environmental/geometrical context in a computer memory.

18. The method of claim 1, wherein said vehicle communication device signals said mobile communication device and suspends said inhibiting of said at least one communication channel of the mobile communication device with a permission signal sent from the vehicle.

19. The method of claim 1, wherein initially inhibiting at least one transmitting, receiving and on-going communication channel of the mobile communications device further comprises self-inhibiting at least one transmitting, receiving and on-going communication channel of the mobile communications device.

20. A method of inhibiting the use of a mobile communication device in a vehicle while in motion, the method comprising the steps of:
    repeatedly obtaining time stamped mobile device GPS data of the location of a mobile communications device;
    obtaining vehicle GPS data of the location of a vehicle communication device;
    comparing the mobile device GPS data to the vehicle GPS data to determine if the mobile communication device is outside a vicinity of the vehicle corresponding to a driver location; and
    if the mobile communication device is outside a vicinity of the vehicle corresponding to the driver location, sending a signal from the vehicle communication device to the mobile communication device to suspend an inhibition of at least one communication channel of the mobile communications device based on the comparison of the mobile device GPS data and the vehicle GPS data.

* * * * *

UNITED STATES PATENT AND TRADEMARK OFFICE
CERTIFICATE OF CORRECTION

PATENT NO. : 8,676,268 B2  
APPLICATION NO. : 12/868213  
DATED : March 18, 2014  
INVENTOR(S) : Steven J. Riggs and Richard J. Skertic Page 1 of 1

It is certified that error appears in the above-identified patent and that said Letters Patent is hereby corrected as shown below:

On the Title Page, item (73), Assignee should read: Anzen Electronics, LLC (Carmel, IN)

Signed and Sealed this  
Tenth Day of June, 2014

Michelle K. Lee  
*Deputy Director of the United States Patent and Trademark Office*